(12) United States Patent
Adams

(10) Patent No.: US 8,101,053 B2
(45) Date of Patent: Jan. 24, 2012

(54) AXIAL FLOW ELECTROLYTIC CELL

(76) Inventor: Pete Adams, Huntington Beach, CA (US)

( * ) Notice: Subject to any disclaimer, the term of this patent is extended or adjusted under 35 U.S.C. 154(b) by 400 days.

(21) Appl. No.: 12/546,090

(22) Filed: Aug. 24, 2009

(65) Prior Publication Data

US 2010/0065422 A1  Mar. 18, 2010

Related U.S. Application Data

(60) Provisional application No. 61/192,307, filed on Sep. 18, 2008.

(51) Int. Cl.
*C25B 9/06* (2006.01)
*C25B 11/03* (2006.01)
*C25B 1/04* (2006.01)

(52) U.S. Cl. ........ 204/272; 205/628; 204/278; 204/284; 204/286.1; 204/288.1

(58) Field of Classification Search .................... 204/272
See application file for complete search history.

(56) References Cited

U.S. PATENT DOCUMENTS

| | | | | |
|---|---|---|---|---|
| 4,379,043 A * | 4/1983 | Chappelle | .................. | 204/228.5 |
| 5,091,152 A * | 2/1992 | Thomas, Sr. | ................ | 204/228.6 |
| 5,102,515 A * | 4/1992 | Ibbott | .......................... | 205/745 |
| 5,256,264 A * | 10/1993 | Hundenborn et al. | ........ | 205/753 |
| 5,788,820 A * | 8/1998 | Liu | ................ | 204/212 |
| 5,861,087 A * | 1/1999 | Manning | ...................... | 204/272 |
| 6,706,168 B2 * | 3/2004 | Igarashi | ....................... | 205/744 |
| 7,135,155 B1 * | 11/2006 | Long et al. | ..................... | 422/224 |
| 2006/0042958 A1 * | 3/2006 | Cole | ........................... | 205/745 |
| 2008/0053822 A1 * | 3/2008 | Miyahara et al. | ............. | 204/272 |
| 2008/0258080 A1 * | 10/2008 | Rippe Toe | .................. | 250/492.1 |
| 2009/0283420 A1 * | 11/2009 | Schadeck et al. | ............. | 205/633 |

* cited by examiner

*Primary Examiner* — Harry D Wilkins, III
(74) *Attorney, Agent, or Firm* — Clement Cheng

(57) ABSTRACT

An axial flow electrolytic cell includes an outer layer made of a polyolefin material and formed as a tube. An outer layer liner lines an inside surface of the outer layer. The outer layer liner is formed as a metal tube. A middle layer is mounted inside the outer layer. The middle layer further includes a middle flow inlet and a middle flow outlet. The middle layer is formed as a metal tube. An inside layer is mounted inside the middle layer. The inside layer has an inside flow inlet and an inside flow outlet. The inside layer is formed as a middle tube. The first electrical connector is mounted to the middle layer at a middle layer connection. The first electrical connector passes through the outer layer and outer layer liner at an outer layer opening. A second electrical connector mounts to the outer layer liner and the inside layer.

18 Claims, 2 Drawing Sheets

AXIAL FLOW ELECTROLYTIC CELL

This application is a non-provisional claiming priority from provisional application 61/192,307 filed Sep. 18, 2008 by same inventor Pete Adams.

FIELD OF THE INVENTION

This invention is in the field of an electrolytic cell.

DISCUSSION OF RELATED ART

A variety of machines can apply voltage to electrodes for electrolysis. Although the amount of elements separated by electric current can be increased in proportion to an increase of electrical current, not all electrolysis machines have the same efficiency or durability. A wide variety of electrolysis methods exist in the prior art.

Most electrolysis methods rely on plate electrode powered by electric current. The electrolysis methods typically have a plate arrangement of anode and cathode in a bath of fluid, such as in U.S. Pat. No. 3,766,045 issued October 1973 to Itakura the disclosure of which is incorporated herein by reference. Other anode and cathode configurations have typically used multiple plates in parallel configuration in a tank where the tank has an inlet and outlet for fluid flow. Unfortunately, the traditional electrolysis plate configured device typically required a separate pump, and great bulk for the tank increasing both the initial cost and the maintenance cost of the system.

SUMMARY OF THE INVENTION

The present invention is directed to an electrolysis device that is also a bubble generator that is configured as an axial flow electrolytic cell. Electrolysis of water generates hydrogen and oxygen that rises and pumps water through the system. The bubbles of gas rise and pull in more water into the cell. Thus, the device is also a pump that has no moving parts. After connecting an electrical supply, the system can be connected to a variety of industrial applications. For example, the system can be used to purify water, create ionized water, or eliminate harmful microorganisms. The bubble byproducts rise and provide pumping with no moving parts when vertically oriented. When horizontal, the system would need a separate pump to maintain the flow.

The construction of the bubble generator includes an outer layer, a middle layer and an inside layer. The outer layer is preferably made of an electrically insulated material such as PVC or some other polyolefin plastic material. The outer layer preferably fits over an outer layer liner which is metal. The outer layer liner is preferably in interference fit with the outer layer. The outer layer liner preferably has no gap between itself and the outer layer. The gapless configuration can be made by heat forming the plastic portion of the outer layer over the outer layer liner.

The middle layer is also preferably made of metal and not in electrical contact with itself and the metal outer layer liner. The inside layer is preferably made of metal. The inside layer preferably also is not in electrical contract with the metal middle layer. The outside layer, the outer layer liner, the middle layer, and the inside layer all preferably have a coaxial configuration whereby they are formed as tubes with spacers in between. The distance between the middle layer and the outside layer liner is preferably the same as the distance between the middle layer and the inside layer. The outer annular seal seat can be formed as a groove or notch on a circumferential inner surface of the outer layer liner for receiving the middle annular seal disposed on an outside surface of the middle layer. The middle layer and the inside layer could alternatively have a seal seat as well.

It may be more convenient to manually assemble the device in an upside down configuration. It is preferred to first mount the inside layer inside the middle layer before inserting the middle layer into the outer layer. The middle flow inlet and the inside flow inlet can be drilled, and the outer layer opening can also be drilled. The inside connection can be threaded such as being tapped. Mechanical connection is preferred over welding.

The first electrical connector is inserted into an outer layer opening disposed on outer layer. The first electrical connector is connected to the middle connection on the middle layer. Thus, the first electrical connector protrudes from the outer layer and has electrical connection to middle layer. The first electrical connector can be formed as a post receiving a power wire. Similarly, the second electrical connector passes through the outer layer and is electrically connected to outer layer liner and the inside layer at an inside connection. The second electrical connector does not touch and does not have the electrical connection with the middle layer. The middle layer has a middle connection opening that allows the second electrical connector a passage through the middle layer. The middle connection opening has a middle connection gap with the second electrical connector which is preferably of the same magnitude or greater than the distance between the outer layer liner and the middle layer. The middle connection gap should also be greater than the distance between the middle layer and the inside layer. The second electrical connector is thus connected to both the inside layer and the outside layer. For the first electrical connector not to touch the outer layer liner, the outer layer liner can begin at a location away from the outer layer opening. Thus, the middle layer would extend beyond the outer layer liner in the preferred embodiment.

When activated, the flow can be horizontal or in a vertical configuration. Fluid flow generally begins with a main flow flowing to the device, then a middle central flow passing through the inside layer. Intermediate flow diverges from the middle central flow and enters into the inside flow inlet. Intermediate flow passes between the inside layer and the middle layer such that it is outside the inside layer but inside the middle layer. The intermediate flow later exits and joins the middle central flow at an inside flow outlet. Fluid flow from the main flow can also be diverted to a middle flow inlet that leads to outer flow. The outer flow passes between the middle layer and the outer layer liner such that it is outside of the middle layer, but inside of the outer layer liner. The outer flow then passes through middle flow outlet and can rejoin the central flow which rejoins the main flow. Therefore, during operation three separate streams form, namely the outer flow, the intermediate flow and the central flow. The streams of flow define channels through which they pass. The outer flow passes through the outer flow channel. The intermediate flow passes through the intermediate flow channel. The central flow passes through the central flow channel.

A variety of annular seals operate to electrically insulate the tube layers from each other and to divert flow accordingly. They can be arranged in different configurations. The middle annular seal can be located ahead of the inside annular seal. Instead of being upstream, the middle annular seal could be downstream of inside annular seal, though it is not the preferred configuration. Furthermore, the middle connection opening permits fluid flow between the outer flow and the intermediate flow.

Upon exiting, a number of methods can be utilized for configuring the outer flow and the intermediate flow which can also be rejoined to the central flow which rejoins the main flow. In the best mode, the fluid flow is vertical with the pair of inside annular seals mounted between the pair of middle annular seals. Although more tubes can be used, the three tube construction is thought to be the best after considering cost, configuration durability, maintenance, and efficiency.

Figure 1:
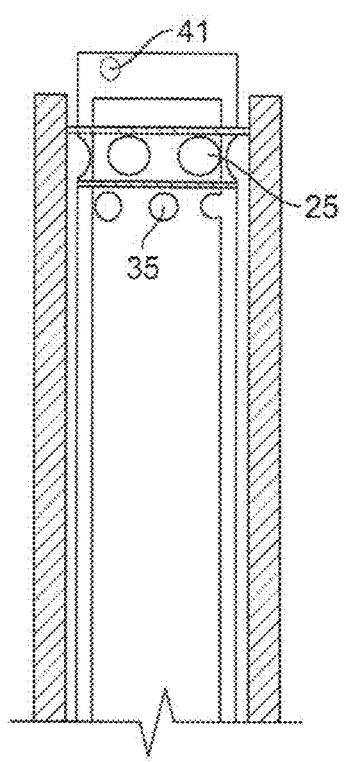
FIG. 1 is an assembled cross-section view of the top half of the present invention.

Reference to the following list of elements used in the drawings may facilitate review of the drawings.

Outer Layer 10
Outer Annular Seal Seat 11
Layer Liner 12
Middle Layer 20
Middle Annular Seal 21
Middle Flow Inlet 25
Middle Flow Outlet 26
Inside Layer 30
Inside Annular Seal 31
Inside Flow Inlet 35
First Electrical Connector 40
Middle Connection 41
Outer Layer Opening 45
Second Electrical Connector 50
Inside Connection 51
Middle Connection Opening 55
Middle Central Flow 70
Main Flow 71
Intermediate Flow 72
Outer Flow 73

DETAILED DESCRIPTION OF THE PREFERRED EMBODIMENT

The construction of the bubble generator includes an outer layer 10, a middle layer 20 and an inside layer 30. The outer layer is preferably made of an electrically insulated material such as PVC or some other polyolefin plastic material. The outer layer 10 preferably fits over an outer layer liner 12 which is metal. The outer layer liner is preferably in interference fit with the outer layer. The outer layer liner 12 preferably has no gap between itself and the outer layer 10. The gapless configuration can be made by heat forming the plastic portion of the outer layer 10 over the outer layer liner 12. The outer layer is preferably bonded to the outer layer liner such that they cannot be easily pulled apart by hand. Here, bonded means that they cannot be easily pulled apart by hand. It is likely not necessary to use sonic welding, cyanoacrylate or other highly secure bonding methods.

The middle layer 20 is also preferably made of metal and not in electrical contact with itself and the metal outer layer liner 12. The inside layer 30 is preferably made of metal. The inside layer preferably also is not in electrical contract with the metal middle layer 20. The outside layer 10, the outer layer liner 12, the middle layer 20, and the inside layer 30 all preferably have a coaxial configuration whereby they are formed as tubes with spacers in between. The distance between the middle layer and the outside layer liner is preferably the same as the distance between the middle layer and the inside layer. The outer annular seal seat 11 can be formed as a groove or notch on a circumferential inner surface of the outer layer liner 12 for receiving the middle annular seal 21 disposed on an outside surface of the middle layer 20. The middle layer 20 and the inside layer 30 could alternatively have a seal seat as well.

Figure 2:
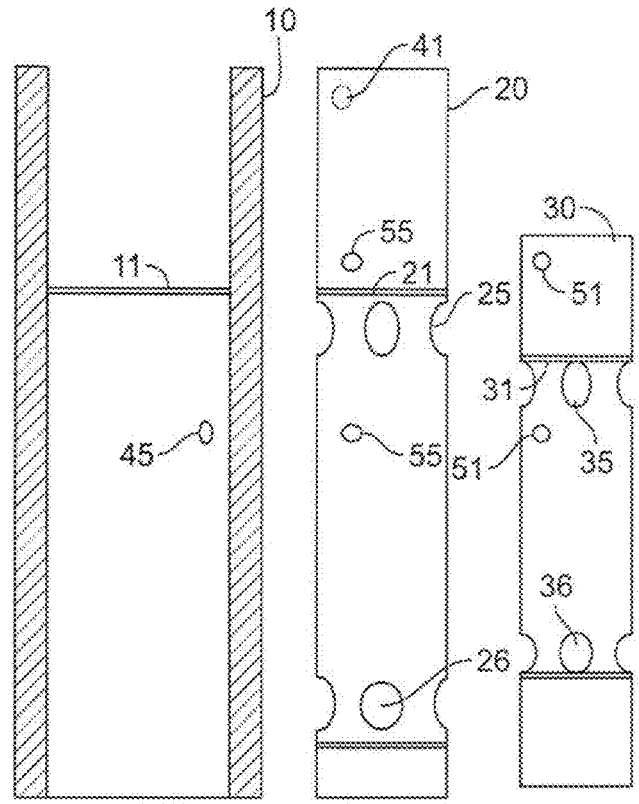
FIG. 2 is an exploded view of the present invention showing assembly.

FIG. 2 shows assembly of the different parts. The parts in FIG. 2 are upside down relative to FIG. 5 as it may be more convenient to manually assemble the device in an upside down configuration. It is preferred to first mount the inside layer inside the middle layer before inserting the middle layer into the outer layer 10. The construction can be hand assembled with hand tools. The middle flow inlet 25 and the inside flow inlet 35 can be drilled, and the outer layer opening 45 can also be drilled. The shape of the openings either plural or singular can be made as slots or ovals or can be round as seen in the figures. The inside connection 51 can be threaded such as being tapped. Mechanical connection is preferred over welding.

Figure 4:
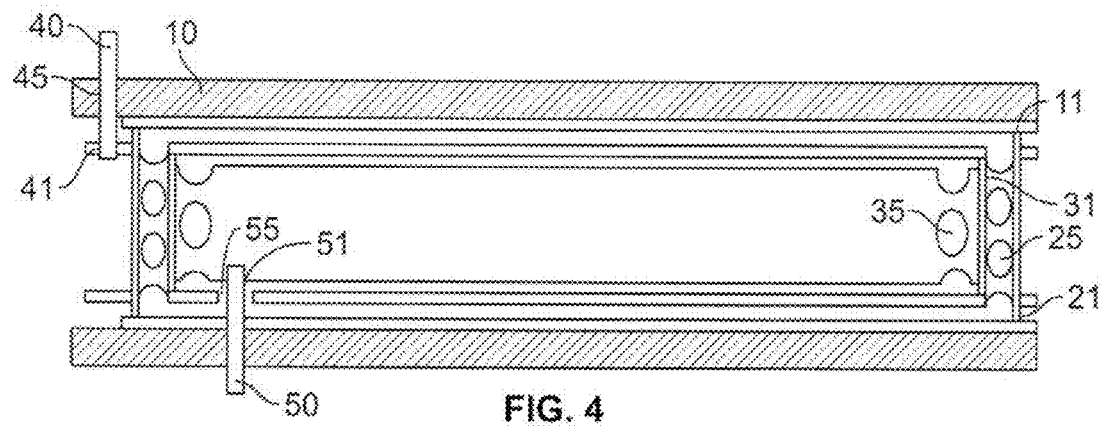
FIG. 4 is a diagram showing electrode connection and assembly.

In FIG. 4, the first electrical connector 40 is inserted into an outer layer opening 45 disposed on outer layer 10. The first electrical connector 40 is connected to the middle connection 41 on the middle layer 20. Thus, the first electrical connector 40 protrudes from the outer layer 10 and has electrical connection to middle layer 20. The first electrical connector 40 can be formed as a post receiving a power wire. Similarly, the second electrical connector 50 passes through the outer layer 10 and is electrically connected to outer layer liner 12 and the inside layer 30 at an inside connection 51. The second electrical connector 50 does not touch and does not have the electrical connection with the middle layer 20. The middle layer 20 has a middle connection opening 55 that allows the second electrical connector 50 a passage through the middle layer 20. The middle connection opening 55 has a middle connection gap with the second electrical connector 50 which is preferably of the same magnitude or greater than the distance between the outer layer liner 12 and the middle layer 20. The middle connection gap should also be greater than the distance between the middle layer 20 and the inside layer 30. The second electrical connector 50 is thus connected to both the inside layer 30 and the outside layer 10. For the first electrical connector 40 not to touch the outer layer liner 12, the outer layer liner 12 can begin at a location away from the outer layer opening 45. Thus, the middle layer 20 would extend beyond the outer layer liner 12 in the preferred embodiment.

Figure 3:
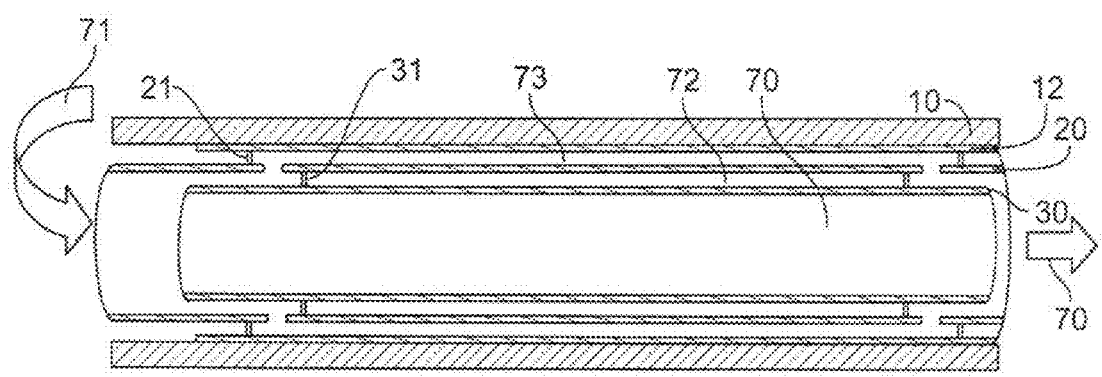
FIG. 3 is a horizontal flow diagram of the present invention.
Figure 5:
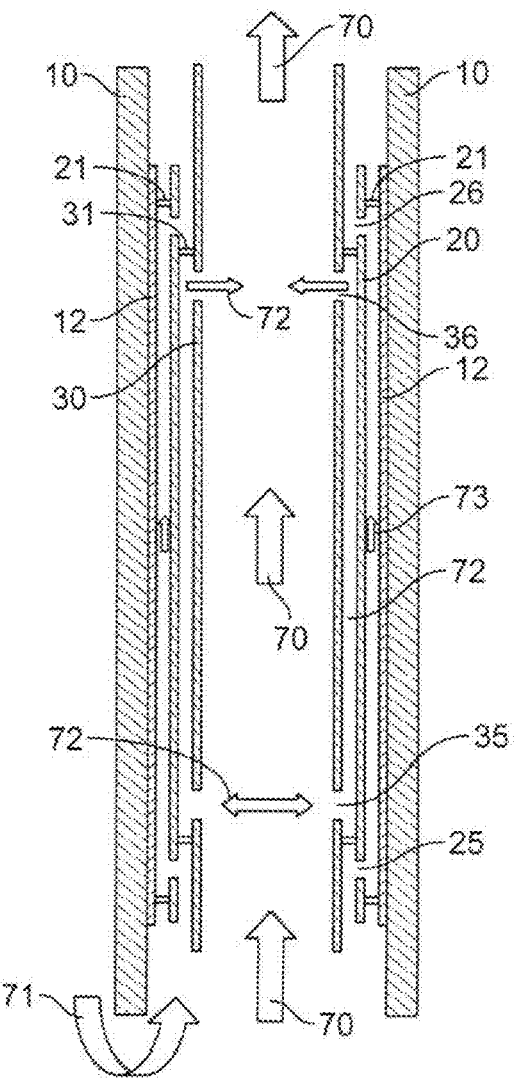
FIG. 5 is a vertical flow diagram of a present invention.

When activated, the flow can be horizontal FIG. 3 or in a vertical configuration as seen in FIG. 5. Fluid flow generally begins with a main flow 71 flowing to the device, then a middle central flow 70 passing through the inside layer 30. Intermediate flow 72 diverges from the middle central flow 70 and enters into the inside flow inlet 35. Intermediate flow 72 passes between the inside layer 30 and the middle layer 20 such that it is outside the inside layer 30 but inside the middle layer 20. The intermediate flow 72 later exits and joins the middle central flow 70 at an inside flow outlet 36. Fluid flow from the main flow can also be diverted to a middle flow inlet that leads to outer flow 73. The outer flow 73 passes between the middle layer 20 and the outer layer liner 12 such that it is outside of the middle layer 20, but inside of the outer layer liner 12. The outer flow 73 then passes through middle flow outlet 26 and can rejoin the central flow 70 which rejoins the main flow 71. Therefore, during operation three separate streams form, namely the outer flow 73, the intermediate flow 72 and the central flow 70. The streams of flow define channels through which they pass. The outer flow 73 passes through the outer flow channel. The intermediate flow 72 passes through the intermediate flow channel. The central flow 70 passes through the central flow channel.

A variety of annular seals operate to electrically insulate the tube layers from each other and to divert flow accordingly. They can be arranged in different configurations. For example, in FIG. 3 the middle annular seal 21 is located ahead of the inside annular seal 31. Instead of being upstream, the middle annular seal 21 could be downstream of inside annular seal 31, though it is not the preferred configuration. Furthermore, the middle connection opening 55 permits fluid flow between the outer flow 73 and the intermediate flow 72. A plurality of middle connection openings can be disposed on the middle layer for facilitating fluid flow between the outer flow and the intermediate flow.

Upon exiting, a number of methods can be utilized for configuring the outer flow 73 and the intermediate flow 72 which can also be rejoined to the central flow 70 which rejoins the main flow 71. In the best mode shown in FIG. 5, the fluid flow is vertical with the pair of inside annular seals 31 mounted between the pair of middle annular seals 21. Although more tubes can be used, the three tube construction is thought to be the best after considering cost, configuration durability, maintenance, and efficiency. The outer layer can be from about ½ inch to 2 inch in diameter. The distance between the inside layer and the middle layer is preferably about 1 mm and the distance between the middle layer and the outside layer liner 12 is also preferably about 1 mm.

The electrical supply is preferably a voltage and current controlled ballast type of configuration that is commonly and commercially available. A variety of these electrical components are UL listed. A wide variety of electrolysis power supplies are commercially available for maintaining control over the voltage and current. Some electrical power supply also include compatibility with certain sensors. Sensors can be placed within the stream flow for feedback control system for controlling fluid flow rate, temperature and for controlling relative percentages of output substances and byproducts.

The electrical supply may have temporal reversibility of polarity such that the anode and cathode alternate with an alternating current that is either sinusoidal or stepped. The middle layer can be either the anode or cathode and the inside layer with the outer layer liner can also be either the anode or cathode.

After connecting an electrical supply, the system can be connected to a variety of industrial applications. For example, the system can be used to purify water, create ionized water, or eliminate harmful microorganisms. The bubble byproducts rise and provide pumping with no moving parts when vertically oriented. When horizontal, the system would need a separate pump to maintain the flow.

The invention claimed is:

1. An axial flow electrolytic cell comprising:
   a. an outer layer and formed as a tube;
   b. an outer layer liner lining an inside surface of the outer layer, wherein the outer layer liner is formed as a metal tube;
   c. a middle layer mounted inside the outer layer, wherein the middle layer further comprises a middle flow inlet and a middle flow outlet, wherein the middle layer is formed as a metal tube;
   d. an inside layer mounted inside the middle layer, wherein the inside layer further comprises an inside flow inlet and an inside flow outlet, wherein the inside layer is formed as a middle tube;
   e. a first electrical connector mounted to the middle layer at a middle layer connection, wherein the first electrical connector passes through the outer layer and outer layer liner at an outer layer opening, wherein the first electrical connector is in electrical connection with the middle layer, but not in electrical connection with the outer layer liner and not in electrical connection with the inside layer;
   f. a second electrical connector mounted to the outer layer liner and the inside layer, wherein the second electrical connector is mounted to the inside layer at an inside layer connection, wherein the second electrical connector passes through the middle layer at a middle connection opening, wherein the middle connection opening allows fluid flow through the middle layer;
   g. a middle flow inlet disposed on the middle layer;
   h. a middle flow outlet disposed on the middle layer;
   i. an inside flow inlet disposed on the inside layer; and
   j. an inside flow outlet disposed on the inside layer.

2. The axial flow electrolytic cell of claim 1, wherein the outer layer liner, the middle layer, and the inside layer are substantially coaxial and vertically oriented.

3. The axial flow electrolytic cell of claim 1, further comprising an outside flow channel, an inside flow channel, and an intermediate flow channel, wherein the inside flow channel passes through the inside layer, wherein the outside flow channel passes between the outer layer and the middle layer, wherein the intermediate flow channel passes between the middle layer and the inside layer.

4. The axial flow electrolytic cell of claim 1, further comprising a pair of middle annular seals disposed on an outside surface of the middle layer, wherein the middle flow inlet and the middle flow outlet are located between the pair of middle annular seals.

5. The axial flow electrolytic cell of claim 1, further comprising a pair of inside annular seals disposed on an outside surface of the inside layer, wherein the inside flow inlet and the inside flow outlet are located between the pair of inside annular seals.

6. The axial flow electrolytic cell of claim 1, wherein the middle layer at the middle connection extends past the outer layer liner.

7. An axial flow electrolytic cell comprising:
   a. an outer layer and formed as a tube;
   b. an outer layer liner lining an inside surface of the outer layer, wherein the outer layer liner is formed as a metal tube;
   c. a middle layer mounted inside the outer layer, wherein the middle layer further comprises a middle flow inlet and a middle flow outlet, wherein the middle layer is formed as a metal tube;
   d. an inside layer mounted inside the middle layer, wherein the inside layer further comprises an inside flow inlet and an inside flow outlet, wherein the inside layer is formed as a middle tube;
   e. a first electrical connector mounted to the middle layer at a middle layer connection, wherein the first electrical connector passes through the outer layer and outer layer liner at an outer layer opening, wherein the first electrical connector is in electrical connection with the middle layer, but not in electrical connection with the outer layer liner and not in electrical connection with the inside layer;
   f. a second electrical connector mounted to the outer layer liner and the inside layer, wherein the second electrical connector is mounted to the inside layer at an inside layer connection;

g. a middle flow inlet disposed on the middle layer;
h. a middle flow outlet disposed on the middle layer;
i. an inside flow inlet disposed on the inside layer; and
j. an inside flow outlet disposed on the inside layer.

8. The axial flow electrolytic cell of claim 7, wherein the outer layer liner, the middle layer, and the inside layer are substantially coaxial and vertically oriented.

9. The axial flow electrolytic cell of claim 7, further comprising an outside flow channel, an inside flow channel, and an intermediate flow channel, wherein the inside flow channel passes through the inside layer, wherein the outside flow channel passes between the outer layer and the middle layer, wherein the intermediate flow channel passes between the middle layer and the inside layer.

10. The axial now electrolytic cell of claim 7, further comprising a pair of middle annular seals disposed on an outside surface of the middle layer, wherein the middle flow inlet and the middle flow outlet are located between the pair of middle annular seals.

11. The axial flow electrolytic cell of claim 7, further comprising a pair of inside annular seals disposed on an outside surface of the inside layer, wherein the inside flow inlet and the inside flow outlet are located between the pair of inside annular seals.

12. The axial flow electrolytic cell of claim 7, wherein the middle layer at the middle connection extends past the outer layer liner.

13. An axial flow electrolytic cell comprising:
a. an outer layer and formed as a tube;
b. an outer layer liner lining an inside surface of the outer layer, wherein the outer layer liner is formed as a metal tube and wherein the outer layer is bonded to the outer layer liner;
c. a middle layer mounted inside the outer layer, wherein the middle layer further comprises a middle flow inlet and a middle flow outlet, wherein the middle layer is formed as a metal tube;
d. an inside layer mounted inside the middle layer, wherein the inside layer further comprises an inside flow inlet and an inside flow outlet, wherein the inside layer is formed as a middle tube;
e. a first electrical connector mounted to the middle layer at a middle layer connection, wherein the first electrical connector passes through the outer layer and outer layer liner at an outer layer opening, wherein the first electrical connector is in electrical connection with the middle layer, but not in electrical connection with the outer layer liner and not in electrical connection with the inside layer;
f. a second electrical connector mounted to the outer layer liner and the inside layer, wherein the second electrical connector is mounted to the inside layer at an inside layer connection;
g. a middle flow inlet disposed on the middle layer;
h. a middle flow outlet disposed on the middle layer;
i. an inside flow inlet disposed on the inside layer; and
j. an inside flow outlet disposed on the inside layer.

14. The axial flow electrolytic cell of claim 13, wherein the outer layer liner, the middle layer, and the inside layer are substantially coaxial and vertically oriented.

15. The axial flow electrolytic cell of claim 13, further comprising an outside flow channel, an inside flow channel, and an intermediate flow channel, wherein the inside flow channel passes through the inside layer, wherein the outside flow channel passes between the outer layer and the middle layer, wherein the intermediate flow channel passes between the middle layer and the inside layer.

16. The axial flow electrolytic cell of claim 13, further comprising a pair of middle annular seals disposed on an outside surface of the middle layer, wherein the middle flow inlet and the middle flow outlet are located between the pair of middle annular seals.

17. The axial flow electrolytic cell of claim 13, further comprising a pair of inside annular seals disposed on an outside surface of the inside layer, wherein the inside flow inlet and the inside flow outlet are located between the pair of inside annular seals.

18. The axial flow electrolytic cell of claim 13, wherein the middle layer at the middle connection extends past the outer layer liner.

* * * * *